Sept. 8, 1959    J. J. JACOBSON    2,903,203
MEASURING DEVICE
Filed March 14, 1955

INVENTOR.
James J. Jacobson
BY Edwin Levisohn &
Harry Cohen
ATTORNEYS

United States Patent Office 2,903,203
Patented Sept. 8, 1959

2,903,203
MEASURING DEVICE

James J. Jacobson, New York, N.Y.

Application March 14, 1955, Serial No. 494,188

2 Claims. (Cl. 242—84.8)

This invention relates generally to a measuring device, and, more particularly, to an encased rolled measuring tape which is adapted for securement to a watch, key ring, or the like.

One object of the present invention is the provision of a measuring device having provision for the releasable securement thereof to a watch chain, key ring, or the like, whereby such measuring device may be conveniently carried on the person in a manner to minimize the danger of loss or misplacement thereof and which may be readily released from said securement for use.

Another object of the present invention is the provision of a measuring device of the above character which takes up substantially no more space in its detached condition than a conventional measuring device, and which may be simply and inexpensively mass-produced.

The above and other objects, features and advantages of the present invention will be more fully understood from the following description considered in connection with the accompanying illustrative drawings.

In the drawing which illustrates the best mode now contemplated by me for carrying out my invention:

Figure 2:
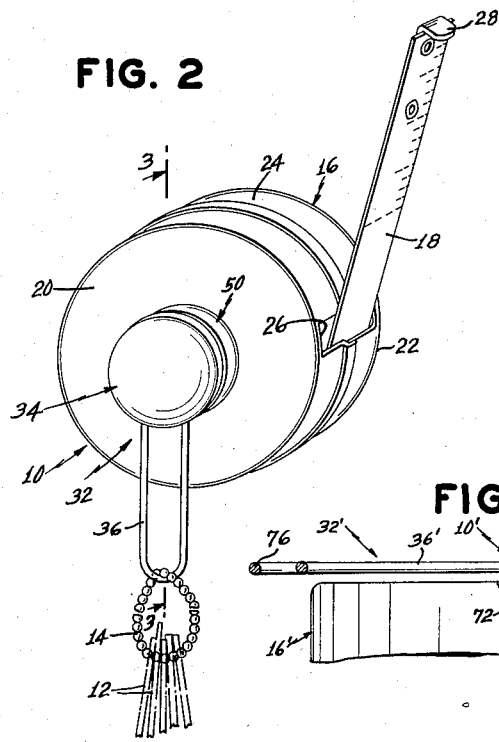
Fig. 2 is a perspective view of the measuring device, on an enlarged scale, shown secured to a key ring.
Figure 1:
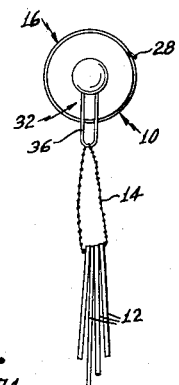
Fig. 1 is a diagrammatic view of a measuring device formed according to the present invention shown secured to a key ring.

Referring to the drawing in detail, there is shown a measuring device 10 which is adapted to be releasably secured to the key ring 14 which may be of any well known type, said measuring device comprising a casing 16 having a flexible tape 18 disposed therein in a rolled condition in the retracted condition thereof, said flexible tape being shown in a partially withdrawn condition in Fig. 2. In the illustrated embodiment the key ring 14 is shown as being of the flexible chain type and is provided with interengageable fittings for the opening thereof for the placement of keys 12 thereon or for the removal of keys therefrom. The casing 16 comprises a pair of laterally spaced side walls 20 and 22 and a peripheral wall 24 which extends therebetween and joins said side walls, said peripheral wall being slotted as indicated at 26 for the extension therethrough of the flexible measuring tape 18. The measuring tape 18 may be of any suitable design and construction and may be encased in casing 16 in any suitable manner, said tape in the illustrated embodiment being constituted by flexible and resilient metallic strip which is spring biased into the casing in a tape retracting direction. The terminal end of the tape 18 is provided with a finger piece 28 to facilitate the withdrawal of said tape from the casing 16. The casing 16 is formed of two mating parts or shells 16a and 16b which are held in assembled relation by means of the rivet 30.

Figure 3:
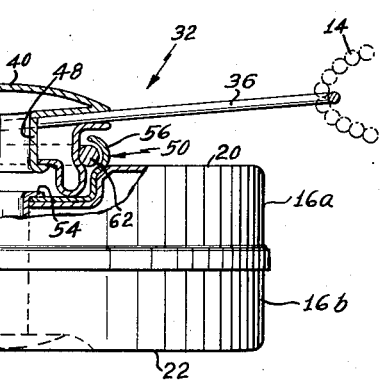
Fig. 3 is a partial sectional view, on an enlarged scale, taken on the line 3—3 of Fig. 2.

Pursuant to the present invention, the measuring device 10 is adapted for releasable snap interengagement with the connector element 32, the latter comprising a securement part 34 having a looped part 36 laterally projecting therefrom, said looped part being adapted for interengagement with the key ring 14. The securement part 34 comprises a male fitting 38 which is secured to the headed part 40 by means of the peripheral flange 42 which is clamped over the peripheral edge 44 of said fitting. The inner end portion 46 of the looped part 36 is interengaged with the shaft portion 48 of the part 40 and said looped part is clamped in position between the fitting 38 and the part 40, as clearly shown in Fig. 3.

The female fitting 50 of the measuring device is formed complementary to the fitting 38 and is adapted for releasable snap engagement therewith, said fitting 50 being secured in the recess 52 defined in the side wall 20 by means of the riveted-over end 54 of the rivet 30, said rivet maintaining the parts 16a, 16b and fitting 50 in assembled relation. Disposed in the arcuate portion 56 of the fitting 50 is a peripheral snap ring 62 which is adapted to snap over the peripheral shoulder 64 of the fitting 38 to provide for the releasable snap interengagement of the complementary fittings 38 and 50.

Measuring device 10 may be conveniently carried on the person in a manner to minimize the danger of loss or misplacement thereof and said measuring device may be readily released from securement to the connector element 32 for use by disengaging the complementary snap fasteners or fittings 38 and 50. Pursuant to the usual key ring construction the key ring is adapted to be opened, in any well known conventional manner, whereby to provide for the interengagement thereof with the looped part 36 of the connector element 32. Thus the measuring device is adapted for securement to a key ring in association with the keys normally carried thereon and since such key ring, having keys secured thereto, is normally carefully protected against loss and misplacement such measuring device will be similarly protected when connected to such key ring.

Figure 4:
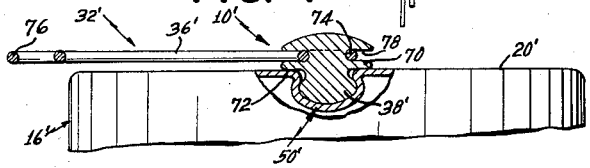
Fig. 4 is a partial sectional view, on an enlarged scale, illustrating a modified form of measuring device.
Figure 5:
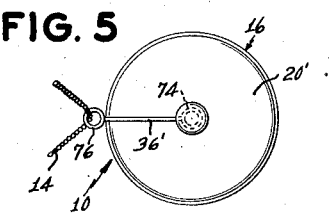
Fig. 5 is a top plan view of the measuring device of Fig. 4 shown secured to a key ring.

With reference to Figs. 4 and 5, there is shown a modified form of measuring device 10' in which the casing 16' has a female fitting 50' integrally formed with the side wall 20' thereof, said fitting being recessed in said side wall and adapted for releasable snap engagement with the complementary male fitting 38' of the connector element 32'. The fitting 38' is provided with a peripheral shoulder 70 which is adapted to abut the peripheral edge 72 of casing 16' when the fittings 38' and 50' are snap engaged as shown in Fig. 4. If desired, the female fitting 50' may be provided with one or more radial slits to facilitate said snap engagement. The part 36' of the connector element 32' terminates in looped portions 74 and 76 at its opposite ends, the portion 74 being secured in the peripheral groove 78 of fitting 50' with the portions 76 being adapted for interengagement with the key ring 14.

While I have shown and described the preferred embodiments of my invention, it will be understood that various changes may be made in the idea or principles of the invention within the scope of the appended claims.

Having thus described my invention, what I claim and desire to secure by Letters Patent is:

1. A measuring device adapted for securement to a key ring, or the like, comprising a casing having a flexible tape disposed therein in a rolled condition in the retracted condition thereof, said tape being adapted to be withdrawn from said casing, and a connector element adapted for interengagement with said key ring, or the like, for securing the measuring device thereto, said casing and said connector element having releasably interengageable parts whereby to provide for the releasable securement of the measuring device to said connector element, said casing comprising a pair of laterally spaced side walls and a peripheral wall extending therebetween and joining said side walls, said peripheral wall being slotted for the extension therethrough of said flexible tape, one of said parts comprising a female fitting recessed in one of said side walls inwardly of the periphery thereof, and a member interengaging said side walls to retain them in casing-defining disposition, said member securing said female fitting to said one of said side walls.

2. A measuring device adapted for securement to a key ring or the like, comprising a casing having a flexible tape disposed therein in a rolled condition in the retracted condition thereof, said casing comprising a pair of laterally spaced side walls and a peripheral wall extending therebetween and joining said side walls, said peripheral wall being slotted for the extension therethrough of said flexible tape, said tape being adapted to be withdrawn from said casing, and a connector element having a looped part adapted for interengagement with said key ring or the like for securing the measuring device thereto, said connector element having a male fitting, and one of said casing side walls having a female fitting recessed therein, said fittings being formed complementary to each other and being adapted to be releasably snap engaged whereby to provide for the releasable securement of the measuring device to said connector element, said connector element having a shaft portion on which said looped part is mounted, said male fitting being secured to said shaft portion and having parts engageable with said looped part for preventing the displacement of said looped part on said shaft portion.

References Cited in the file of this patent
UNITED STATES PATENTS

| | | |
|---|---|---|
| 736,052 | Adamson | Aug. 11, 1903 |
| 736,359 | Buck | Aug. 18, 1903 |
| 1,023,816 | Coggeshall | Apr. 23, 1912 |
| 1,045,300 | Lary | Nov. 26, 1912 |
| 1,402,589 | Farrand | Jan. 3, 1922 |
| 1,988,428 | Carlson | Jan. 15, 1935 |
| 2,632,222 | Becker | Mar. 24, 1953 |